Feb. 10, 1959
A. U. BRYANT
2,873,086
ORIFICE FITTING
Filed Sept. 8, 1953
6 Sheets—Sheet 1
FIG_1_
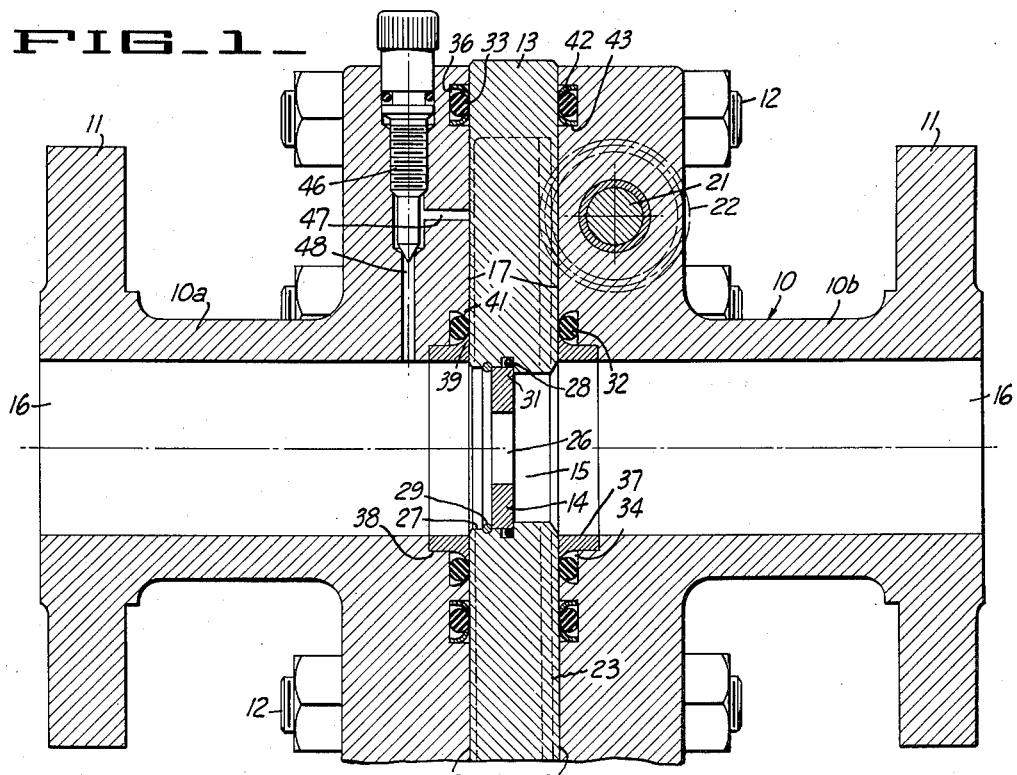
FIG_2_
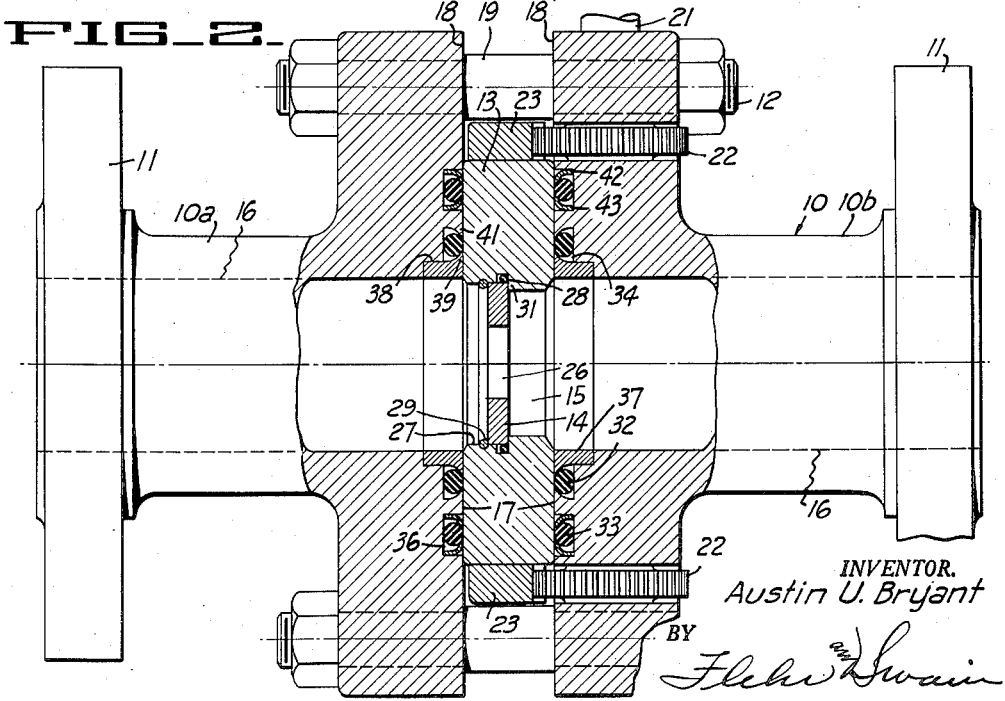
INVENTOR.
Austin U. Bryant
BY
ATTORNEYS Feb. 10, 1959      A. U. BRYANT      2,873,086
ORIFICE FITTING
Filed Sept. 8, 1953      6 Sheets-Sheet 2
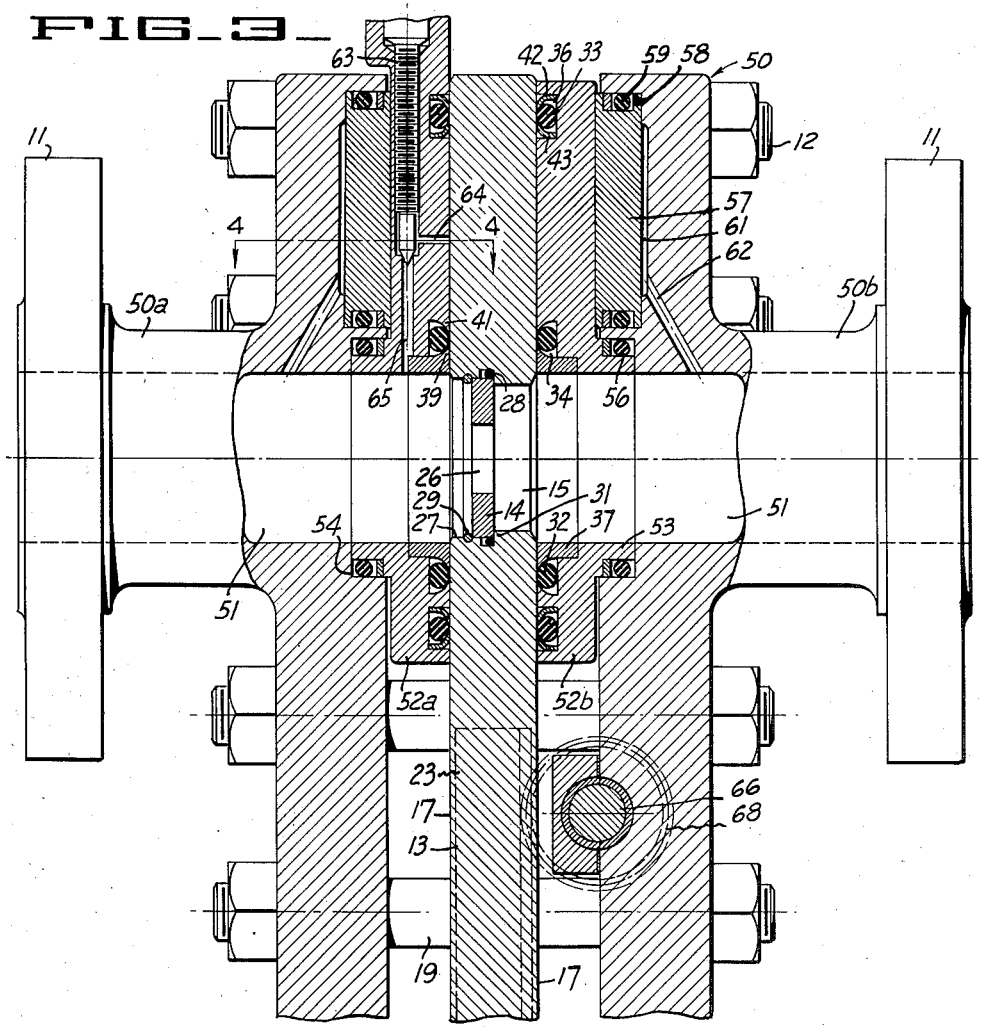
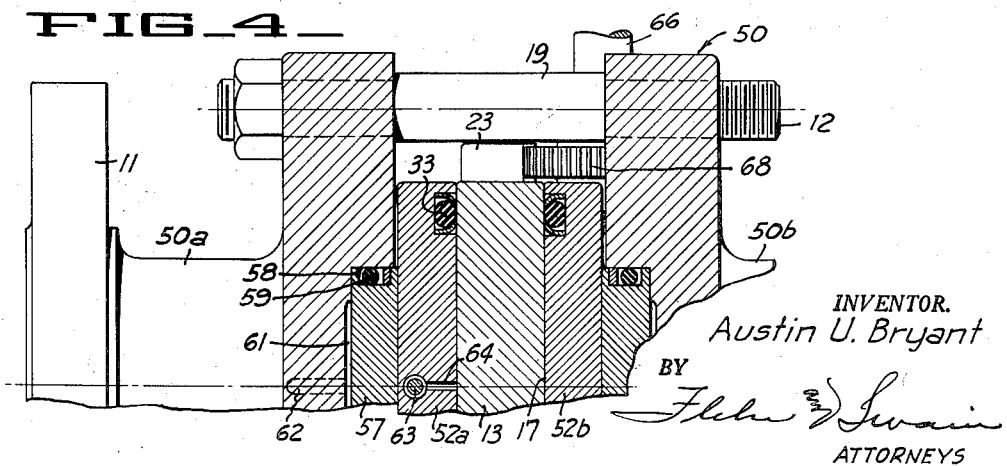
INVENTOR.
Austin U. Bryant
BY
ATTORNEYS

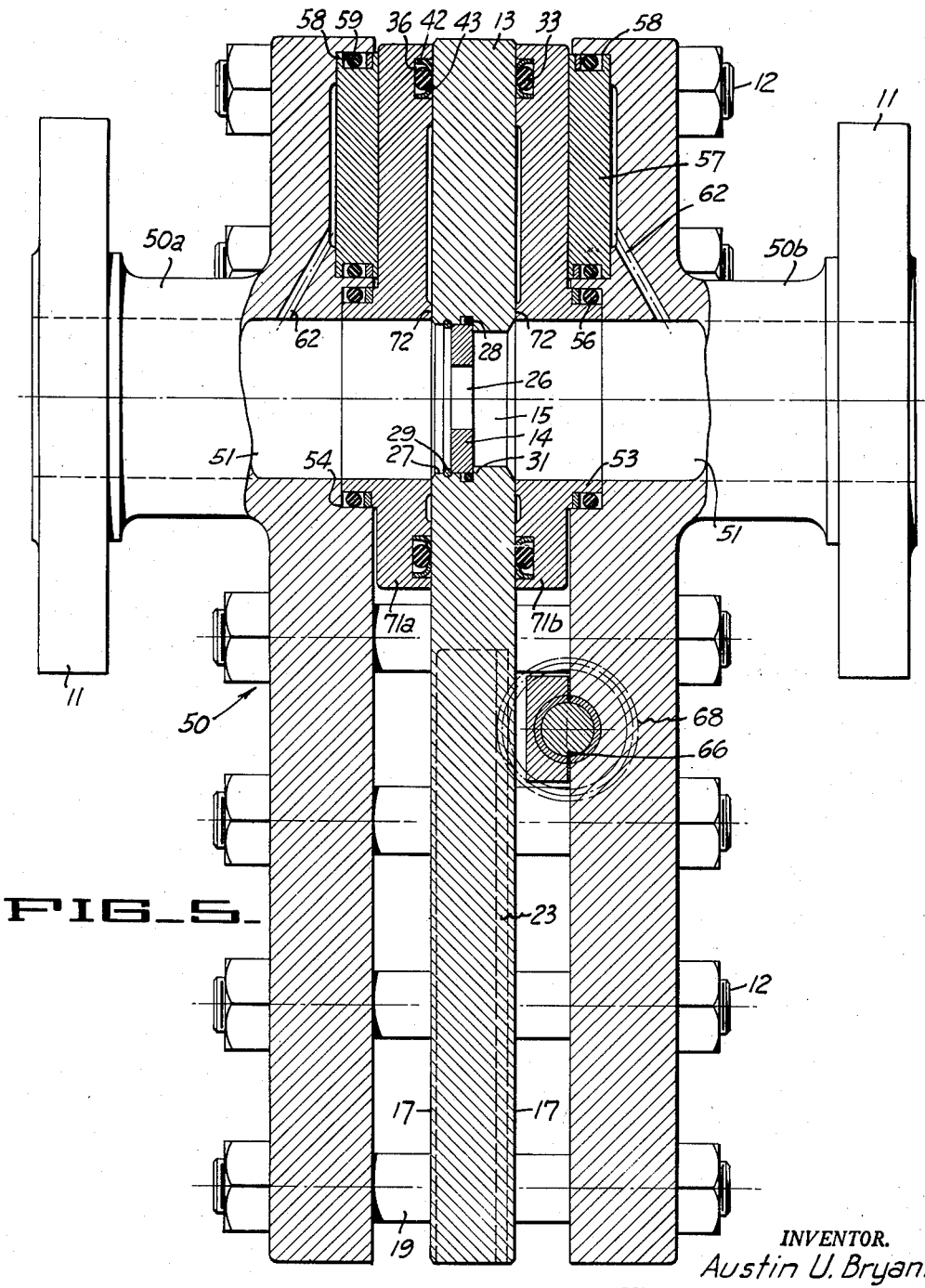

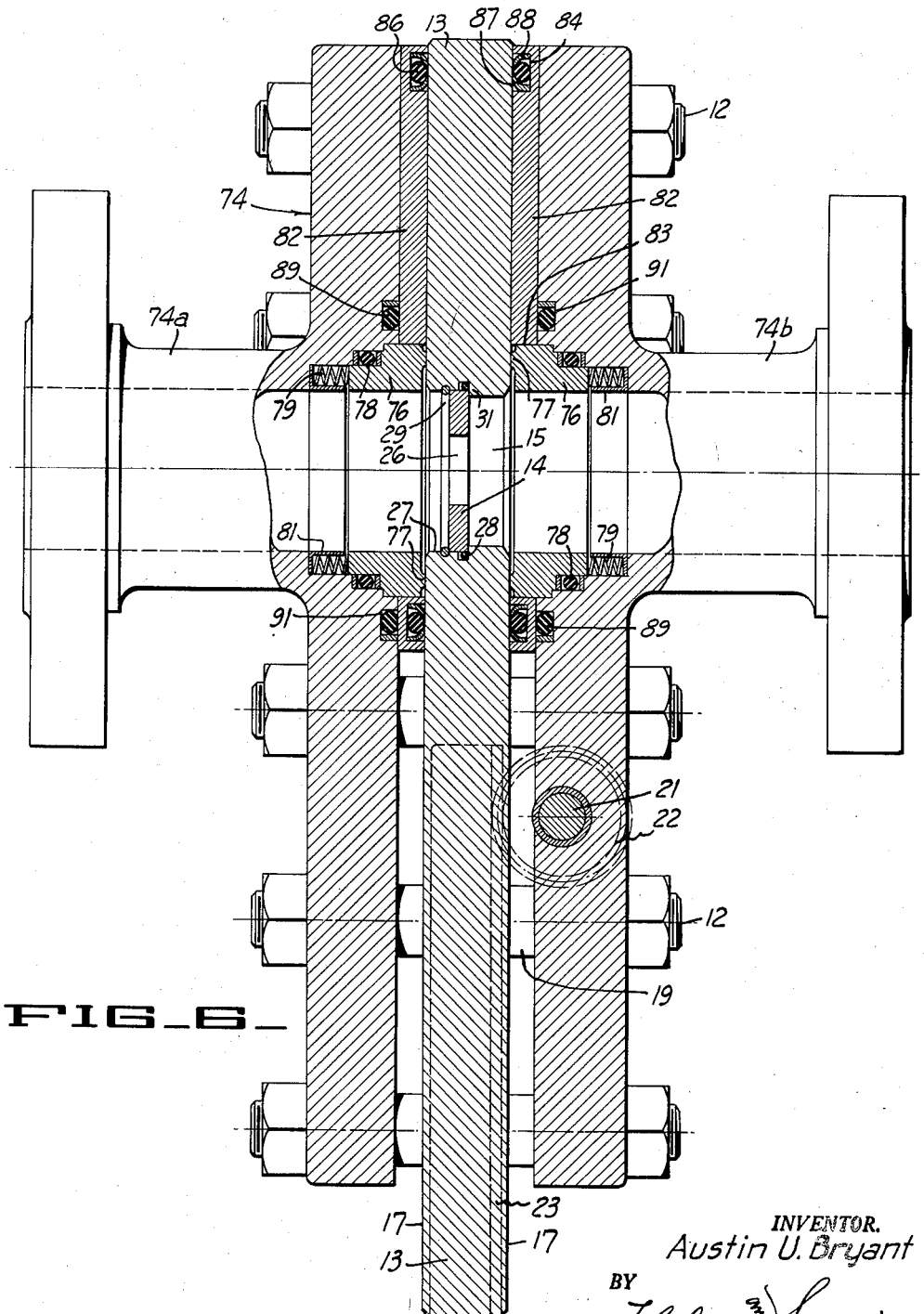

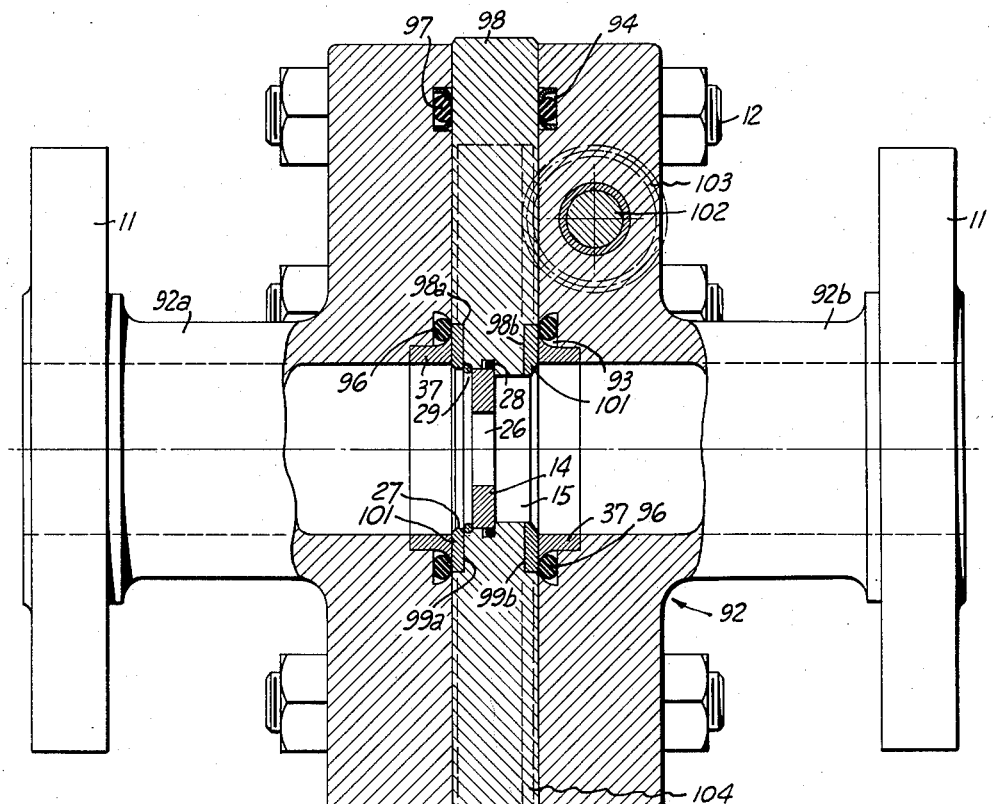
FIG_7_
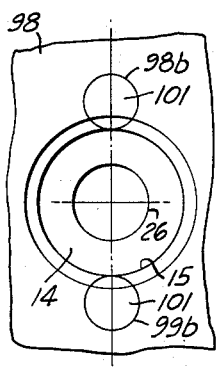
FIG_9_

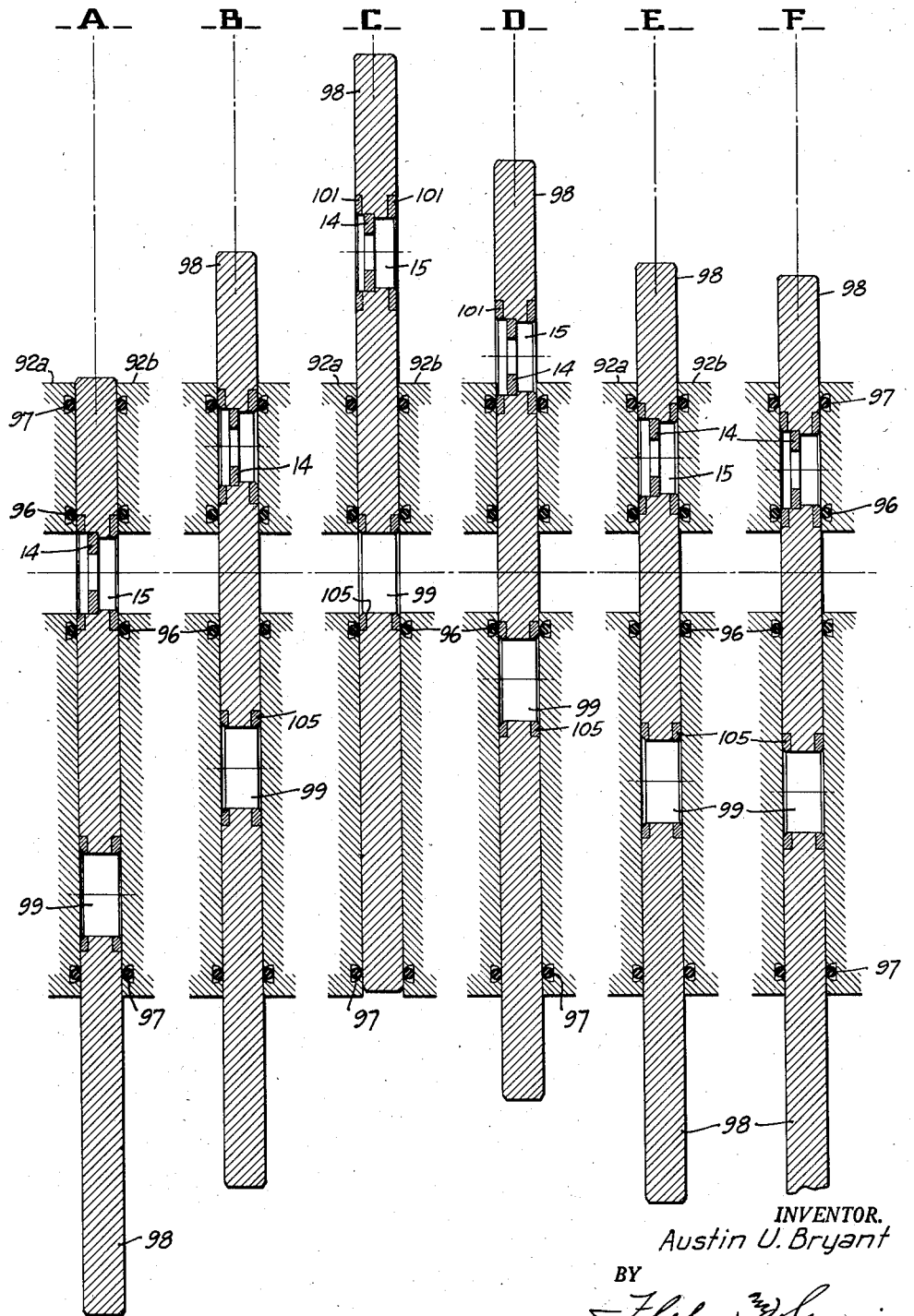

United States Patent Office 2,873,086
Patented Feb. 10, 1959

2,873,086

ORIFICE FITTING

Austin U. Bryant, Walnut Creek, Calif., assignor, by mesne assignments, to Walworth Company, New York, N. Y., a corporation of Massachusetts Application September 8, 1953, Serial No. 378,721

3 Claims. (Cl. 251—282)

This invention relates generally to apparatus for introducing metering orifices into fluid flow lines, and which are known generally as orifice fittings.

In gas distribution and other fluid flow systems it is frequently necessary to introduce an orifice into a flow line for the purpose of metering the flow. At various times the orifice plate must be changed to provide an orifice of a size proper for the fluid flow, or one may wish to remove the orifice in entirety, or shut off further flow. Orifice fittings which have been used in the past for this purpose have been difficult to maintain tight against fluid leakage, having reference both to leakage from the line under normal conditions, or leakage during operation of the fitting to replace an orifice plate. Pressure lubrication applied to grooves in valve working surfaces has been used to some extent to prevent leakage, but has certain inherent disadvantages, including the requirement for double manipulation, and introduction of extraneous material into the line.

In general it is an object of the present invention to provide an orifice fitting which maintains a bubble tight seal, without the use of pressure lubrication or like lubricating means.

Another object of the invention is to provide an orifice fitting making novel use of sealing means of the O-ring type.

Another object of the invention is to provide a device of the above character having novel means to provide utmost safety, particularly when used on relatively high line pressures, as for example pressures of the order of 1000 p. s. i. or higher.

Additional objects and features of the invention will appear from the following description in which the preferred embodiments have been set forth in detail in conjunction with the accompanying drawing.

Referring to the drawing:

Figure 1 is a side elevational view in section illustrating an orifice fitting incorporating the present invention.

Figure 2 is a view of the same valve shown in Figure 1 but turned through 90° and partly in section.

Figure 3 is a view like Figure 1 but showing another embodiment of the invention.

Figure 4 is a fragmentary detail in section and taken along the line 4—4 of Figure 3.

Figure 5 is a view like Figure 1 but illustrating another embodiment of the invention.

Figure 6 is a side elevational view like Figure 1 but illustrating another embodiment.

Figure 7 is a side elevational view partly in section illustrating another embodiment of the invention.

Figures 8–A to F inclusive are schematic views illustrating various operating positions of the fitting shown in Figure 7.

Figure 9 is a fragmentary side view of a portion of the gate shown in Figure 7.

The invention as illustrated in Figures 1 and 2 of the drawing consists of a body 10 provided with flanges 11 or like means for making connection with associated piping. The body in this instance is formed in two parts 10a and 10b, which are secured together by suitable means such as the bolts 12. A valve member 13 is slidably disposed between the body parts 10a and 10b, and serves to carry the orifice plate 14 within the port 15. In Figure 1 this orifice plate is shown in metering position between the flow passages 16 of the two body parts.

The valve member 13 is in the form of a metal plate having flat parallel side surfaces 17. The side surfaces operate in close juxtaposition with the opposed flat surfaces 18 formed on the body parts 10a and 10b. The spacing between surfaces 18 is slightly greater than the thickness of the member 13, and this relationship is maintained by the spacing collars 19, which are carried by the bolts 12.

Suitable means is provided for moving the member 13 in the direction of its length. In Figures 1 and 2 this means consists of a rotatable operating rod 21, which is journaled in body part 10b, and to which the pinions 22 are secured. These pinions engage racks 23 that are attached to the edges of the member 13. The collars 19 are positioned to be in close relationship with the exterior surfaces of the racks 23, thus guiding the member 13 for movements in opposite directions.

The orifice plate 14 is in the form of a disc having an orifice opening 26 of predetermined size. It is fitted within the bore 27 formed in the member 13, and seats against the shoulder 31. Leakage about the plate 14 is prevented by suitable means such as the resilient seal ring 28 of the O-ring type. A spring snap-in ring 29 serves to detachably hold the plate 14 within the bore 27, and against the shoulder 31.

By turning the rod 21 the member 13 can be raised from the position shown in Figure 1 to eventually transpose the orifice plate 14 to a position exterior of the body. While in that position the plate can be inspected or removed, and thereafter repositioned as shown in Figure 1.

With the arrangement described above I provide novel sealing means to prevent leakage between the surface 17 and/or member 13, and the surfaces 18 of the body. The sealing means in this instance employs seal rings 32 and 33 of the O-ring type. Each of the seal rings 32 establishes a seal in an annular area which embraces the corresponding flow passage 16. Each seal ring 33 establishes a seal in a continuous area which likewise embraces the corresponding flow passage 16, but which also embraces the corresponding seal ring 32, and an area to one side of the seal ring 32 that is occupied by the orifice plate 14 while this plate is being translated to a position exterior of the body. This proportioning is illustrated in Figures 1 and 2. Each ring 33, as viewed along a direction at right angles to its general plane, can extend ovaloid or elliptical, rather than circular.

Each of the seal rings 32 is accommodated in a circular groove 34 provided in the adjacent face of the corresponding body part, while each seal ring 33 is similarly accommodated in an O-ring retaining groove 36. The inner side of each groove 34 is defined by a collar or sleeve 37 loosely fitted within a bore 38 formed in the body, and which has one end of the same contacting the adjacent side face of member 13. Sleeve 37 is shown provided with a lip 39, and the body is provided with a similar lip 41, to aid in holding the O-ring within its accommodating groove.

Each of the seal rings 33 are shown held in place by the metal insert rings 42 and 43. These rings (as viewed in section) are dished to the form shown in Figure 1, to provide lips for holding the O-ring within its accommodating groove.

With the arrangement described above it will be evident that both of the seal rings 32 and 33 prevent leakage to the atmosphere when the valve member 13 is in the orifice operating position shown in Figure 1. As the valve member 13 is moved upwardly the port is first transposed into a position intermediate the rings 32 and 33 and thereafter it is transposed to the exterior of the body. Assuming that an operator has replaced the orifice plate 14, and that it is desired to return the orifice to its operating position, valve member 13 is moved downwardly by turning rod 21 whereby the port 15 is moved past the O-ring 33 until it occupies a position between this O-ring and the ring 32. At that point it is desirable to equalize the pressure within the port with the line pressure. For this purpose I have shown a needle valve 46 which is threaded within the body, and which when open connects the ducts 47 and 48. Duct 47 connects with the port 15 when this port is located between the rings 32 and 33. Duct 48 connects to the line. After the pressure has been equalized in the port 15, needle valve 46 is closed, and then valve member 13 is moved a distance sufficient to bring the orifice plate 14 back into alignment with the flow passages 16.

In the embodiment of Figures 3 and 4 the resilient O-rings 32 and 33 are carried by parts which are formed separate from the body. Thus in this instance the body 50 is formed of the separate parts 50a and 50b, that have the aligned flow passages 51, and which correspond to the body parts 10a and 10b of Figure 1. The valve member 13 and the parts directly mounted upon the same are the same as in Figures 1 and 2. Plates 52a and 52b are interposed between the sides of the valve member 13 and the adjacent opposed faces of the body parts 50a and 50b. Each of these members is provided with a projecting sleeve 53, that extends into a body bore 54, and is sealed with respect to the body by means of the resilient O-ring 56. In the region extending between the resilient O-rings 32 and 33, the members 52a and 52b are each engaged by a fluid pressure operated piston 57. Each of these pistons is fitted within a body bore 58 and is sealed with respect to the body as by means of the resilient O-ring 59. The space 61 behind each piston 57 is in communication with the corresponding body passage 51, by means of duct 62. Thus each piston 57 is urged by line pressure against the adjacent portion of members 52a, 52b, whereby this member in turn is urged against the adjacent side of the valve member 13.

Each seal ring 32 is accommodated within a groove 34 formed in the same manner as in Figure 1. Each seal ring 33 is similarly retained within a recess 36, in conjunction with the metal retaining rings 42 and 43, in the same manner as in Figure 1.

For pressure equalization member 52a is shown provided with the manual needle valve 63, which when open permits flow through the ducts 64 and 65.

The operating rod 66 is shown carried by the body in a position generally below the member 52b. It carries pinions 68 which engage with the gear racks 23.

In general the embodiment of Figures 3 and 4 operates in the same manner as Figures 1 and 2. The fluid pressure operating pistons 57 serve to continuously urge the members 52a, 52b against the sides of the valve member 13, and to maintain the necessary initial compression of the resilient O-rings 32 and 33.

In Figure 5 the members 71a, 71b correspond to the members 52a, 52b of Figure 3, and these members are similarly urged against the sides of the valve member 13, by the pistons 57. However, in place of the seal established by the O-ring 32 of Figure 3, annular metal seat members 72 are formed directly upon the members 71a, 71b. For the normal position of the orifice illustrated in Figure 5, the outer seal ring 33 prevents leakage past the valve member 13. However, when the valve member is being moved to translate the orifice to the exterior of the body, the annular seats 72 form an approximate seal with respect to the valve member, thus preventing any excessive discharge of fluid when the port 15 is partly exterior and partly interior of the O-ring 33.

In the embodiment of Figure 6 the body parts 74a and 74b are bored to accommodate the seal rings 76. The seal rings are provided with sealing surfaces 77, which are metal, and which engage side faces of the valve member 13. The rings 76 are sealed with respect to the body as by means of a resilient O-ring 78 and they are urged toward the valve member by suitable means such as the compression springs 79. These springs are shown closed with respect to the line fluid by the metal shrouds 81.

Plates 82 are interposed between the valve member 13 and the adjacent opposed faces of the valve body. The plates are apertured as indicated at 83, to accommodate the rings 76. The plates 82 are provided with the grooves 84 that accommodate the exterior sealing rings 86 of the O-ring type. These rings are held in place by the metal retainer rings 87 and 88. Each plate 82 is sealed with respect to the body by suitable means such as the resilient O-ring 89. Each of these O-rings is accommodated within a groove 91 formed in the associated part of the valve body.

Operation of the embodiment illustrated in Figure 6 is substantially the same as the embodiment of Figure 5.

In the embodiment of Figure 7 the two body parts 92a, 92b are provided with grooves 93 and 94, which accommodate the resilient seal rings 96 and 97, in substantially the same manner as described with reference to Figures 1 and 2. The valve member 98 is of extended length and is provided with the port 99. The valve member 98 adjacent the port 15 is provided with the bleed ducts 98a, 98b, and 99a, 99b. As shown in Figure 9, each of these bleed ducts can be formed by the clearance between a button or like insert 101 and a bore in which the button is fitted. The button can be held in place by providing threading, or by providing knurling whereby the button is press-fitted, with sufficient clearance, however, to establish a duct of small effective cross-sectional area. The ducts 99a and 99b can be similarly formed. The valve member 98 in this instance is operated by the rotatable shaft 102, which has pinions 103 engaging gear racks 104. Additional bleed ducts are provided by the insert buttons 105, which are the same as buttons 101.

Figures 8A to F inclusive illustrate various stages in the operation of the device of Figure 7.

Figure 8A illustrates the same relative positioning of the parts as shown in Figure 7. Here the port 15 is aligned with the body passages, as in normal metering of fluid flow. Figure 8B illustrates the valve member 98 being moved partly to open position, and with the ducts 98a, 98b extending cross the seal rings 97. In this position the port 15 is sealed off from the body passages, by the inner seal ring 96, but fluid pressure within the port is permitted to vent out to the atmosphere through the vent ducts 98a, 98b. Further movement of the valve member 98 brings the orifice plate to the exterior of the body as shown in Figure 8C. Assuming that a new plate has been inserted, and it is desired to return the plate back into operating position, the valve member 98 is moved downwardly to the initial position shown in Figure 8D. Here the ducts 99a, 99b have been made to span the outer seal rings 97 whereby any trapped fluid pressure between seal rings 96 and 97 is vented to the atmosphere. Figure 8E shows valve member 98 positioned with the port 15 disposed entirely between the seal rings 96 and 97. Figure 8F shows the ducts 99a and 99b spanning the inner seal ring 96, whereby line pressure is permitted to enter the port 15, thus effecting pressure equalization. Further movement of the valve member 98 brings it to the position shown in Figure 8A. Insert buttons 105 provide bleed ducts which enable pressure equalization when port 99 is near the main valve passage (Figure 7D).

It will be evident that the operation described above with reference to Figures 8A to 8F inclusive avoids abrupt venting of trapped pressure to the atmosphere which might be hazardous to the operator, and when returning the valve member to its initial position pressure is equalized in such a manner as to avoid abrupt discharge of fluid past the inner seal ring 96, thus avoiding the possibility that this seal ring may be dislodged from its retaining groove.

I claim:

1. An orifice fitting of the character described comprising a body having flow passages adapted to be connected with associated piping, a flat plate-like valve member fitted within the body and adapted to be moved in opposite directions laterally of said passages, said valve member having a port therethrough adapted to be brought into registry with the passages for flow of fluid therethrough, said valve member being movable to a position to shift the port to a location exterior of the body, said port being adapted to accommodate an orifice metering fitting, means forming continuous seals between both sides of the valve member and the body sealing off regions embracing the flow passages, and additional means of the O-ring type forming continuous seals between both sides of the valve member and the body sealing off regions which generally embrace said first named regions, and are spaced outwardly from the same, spacing between said seal means on one side of the passage being greater than the diameter of the port in the valve member whereby the valve member can be disposed with said port located exterior of the first regions and within the second regions for closed position of the valve member.

2. An orifice fitting as in claim 1, together with means for effecting equalization of pressure between said port and a flow passage in the body, when the port is located in said last named position.

3. An orifice fitting of the character described comprising a body providing aligned fluid passages adapted to be connected with associated piping, a flat plate-like valve member fitted within the body and adapted to be moved in opposite directions laterally of the fluid passages, said valve member having a first and a second port therethrough adapted separately to be brought into registry with the passages for flow of fluid therethrough, the first port being transposed to the exterior of the valve body when the second port is aligned with said passages, said second port being within the body when the first port is aligned with said passages, said first port being formed to receive an orifice fitting, means forming continuous seals between the valve member and side faces of the body sealing off regions embracing the flow passage, and additional means of the O-ring type forming continuous seals between the side faces of the valve member and the body sealing off regions which generally embrace and are disposed outwardly with respect to the first named regions, said first and second regions being proportioned whereby when the valve member is moved to bring said first port from said position of registry to a position exterior of the body, said second port progresses from a position in which it is positioned outside the first regions but within the second regions to a position within the first regions, and whereby when said first port is within the body said second port is located in said last named position.

References Cited in the file of this patent

UNITED STATES PATENTS

| | | |
|---|---|---|
| 562,410 | Moon | June 23, 1896 |
| 1,617,503 | Seymour | Feb. 15, 1927 |
| 1,957,807 | Robinson | May 8, 1934 |
| 2,219,504 | Willis | Oct. 29, 1940 |
| 2,360,733 | Smith | Oct. 17, 1944 |
| 2,664,267 | Ray | Dec. 29, 1953 |
| 2,718,372 | Broz | Sept. 20, 1955 |
| 2,780,232 | Ney | Feb. 5, 1957 |

FOREIGN PATENTS

| | | |
|---|---|---|
| 671,546 | Great Britain | May 7, 1952 |
| 510,794 | Belgium | May 15, 1952 |
| 1,053,141 | France | Sept. 30, 1953 |
| 1,089,995 | France | Oct. 13, 1954 |